(12) United States Patent
Ming-Shun

(10) Patent No.: US 8,276,967 B1
(45) Date of Patent: Oct. 2, 2012

(54) STRUCTURE OF FLOOR MAT OF CARGO BED OF TRUCK

(75) Inventor: Yang Ming-Shun, Taipei (TW)

(73) Assignee: Formosa Saint Jose Corp., Taipei (TW)

( * ) Notice: Subject to any disclaimer, the term of this patent is extended or adjusted under 35 U.S.C. 154(b) by 0 days.

(21) Appl. No.: 13/352,345

(22) Filed: Jan. 18, 2012

(51) Int. Cl.
*B60R 13/01* (2006.01)

(52) U.S. Cl. .................................... 296/39.2; 296/97.23

(58) Field of Classification Search ............. 296/183.1, 296/37.6, 39.2, 97.23; 150/166
See application file for complete search history.

(56) References Cited

U.S. PATENT DOCUMENTS

| | | | | |
|---|---|---|---|---|
| 2,057,873 A * | 10/1936 | Atwood | ............... | 428/40.1 |
| 4,111,481 A * | 9/1978 | Nix et al. | ............... | 296/39.2 |
| 4,128,271 A * | 12/1978 | Gray | ............... | 296/39.2 |
| 4,161,335 A * | 7/1979 | Nix et al. | ............... | 296/39.2 |
| 4,162,098 A * | 7/1979 | Richardson, III | ............... | 296/39.2 |
| 4,181,349 A * | 1/1980 | Nix et al. | ............... | 296/39.2 |
| 4,802,705 A * | 2/1989 | Elwell | ............... | 296/39.2 |
| 4,944,612 A * | 7/1990 | Abstetar et al. | ............... | 296/39.2 |
| 4,958,876 A * | 9/1990 | Diaco et al. | ............... | 296/39.2 |
| 5,007,671 A * | 4/1991 | Oprea | ............... | 296/39.2 |
| 5,100,193 A * | 3/1992 | Oprea et al. | ............... | 296/39.2 |
| 5,152,572 A * | 10/1992 | Ellis | ............... | 296/97.23 |
| 5,421,634 A * | 6/1995 | Hackett | ............... | 296/183.1 |
| 5,474,829 A * | 12/1995 | Woosley | ............... | 428/88 |
| 5,648,031 A * | 7/1997 | Sturtevant et al. | ............... | 264/80 |
| 5,695,235 A * | 12/1997 | Martindale et al. | ............... | 296/39.2 |
| 5,722,711 A * | 3/1998 | German | ............... | 296/39.2 |
| 5,795,007 A * | 8/1998 | Yamamoto | ............... | 296/39.2 |
| 5,988,723 A * | 11/1999 | Adkins | ............... | 296/39.2 |
| 6,022,062 A * | 2/2000 | Fleenor | ............... | 296/39.2 |
| 6,059,343 A * | 5/2000 | Emery | ............... | 296/39.2 |
| 6,644,721 B1 * | 11/2003 | Miskech et al. | ............... | 296/183.1 |
| 7,416,236 B2 * | 8/2008 | Boddie et al. | ............... | 296/39.2 |
| 2002/0140247 A1 * | 10/2002 | Emery | ............... | 296/39.1 |
| 2004/0160077 A1 * | 8/2004 | Burtin | ............... | 296/39.1 |
| 2008/0277959 A1 * | 11/2008 | Boddie et al. | ............... | 296/39.2 |

* cited by examiner

*Primary Examiner* — Jason S Morrow
(74) *Attorney, Agent, or Firm* — Leong C. Lei

(57) ABSTRACT

A structure of floor mat of automobile cargo bed includes a mat body that is integrally formed and made of a thermoplastic rubber material. The mat body has an outer contour matching the contour and size of the internal floor of an automobile cargo bed and is laid flat on the floor of the cargo bed. The mat body has a bottom forming a plurality of triangular prism like grooves. When the mat body is wound up to collapse, the grooves form folding lines that provide an effect of positioning so as to make winding up the mat body easy and providing a reduced collapsed size of the mat, whereby the amount of space required for stowage is reduced and product transportation is facilitated.

2 Claims, 6 Drawing Sheets

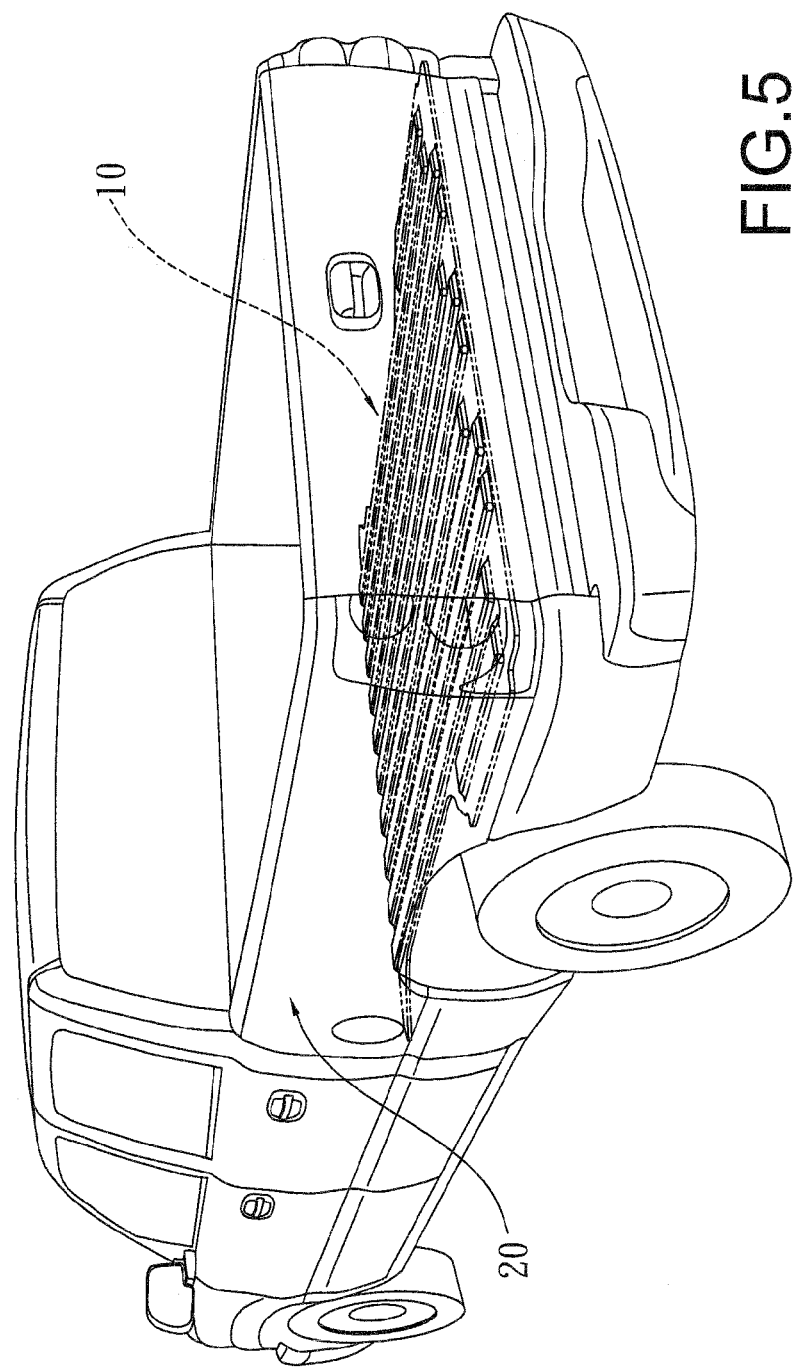

STRUCTURE OF FLOOR MAT OF CARGO BED OF TRUCK

TECHNICAL FIELD OF THE INVENTION

The present invention generally relates to a structure of floor mat of cargo bed of truck, and more particularly to an audio playing device that is turned on or off by existing wiring to start or stop playing digital audio files automatically.

DESCRIPTION OF THE PRIOR ART

Automobiles are a convenient transportation and are roughly categorized as passenger cars that generally transport passengers, trucks that generally transport cargos and pickup trucks that may transport both cargos and passengers. Both the cargo truck and the pickup truck have a rear bed for carrying cargos. A rubber made floor mat is often laid flat on the cargo bed. The rubber made floor mat protects the cargo bed from being scratched in loading/unloading cargos and also provides the functionality of skidding resistance, sound isolation, and cushioning that protects cargos against impacts caused by shocks and vibrations occurring in the travel of the truck. The rubber mat is often of a great size in order to completely cover the whole floor of the cargo bed and also, the rubber mat often forms a corrugated surface to match the floor corrugation of the cargo bed. This makes winding-up of the mat difficult and also increases the overall size of a wound-up mat.

Further, the floor mat laid on the bed floor of a truck has to support the weight of cargo carried on the truck bed and is also subjected to attack by sunlight exposure and rainwater. Thus, the floor mat must be of the properties of weight sustainability, impact durability deflection durability, and excellent resistance against acids and alkalis. Consequently, such a mat would suffer the drawbacks of being hard to wind up and having a great size after being wound up due to the stiffness of the material used.

In view of these problems of the conventional cargo bed floor mat of truck, the present invention aims to provide a structure of floor mat that is easy to collapse and shows a reduced size after collapsed.

SUMMARY OF THE INVENTION

The primary objective of the present invention is to provide a structure of floor mat of automobile cargo bed, which, besides protecting the floor of the cargo bed, provides an arrangement of grooves formed in the mat to facilitate formation of folding lines that provide an effect of positioning so as to make winding up the mat easy.

Another objective of the present invention is to provide a structure of floor mat of automobile cargo bed, which provides a reduced collapsed size of the mat after the mat is collapsed so that the stowage space for the mat is reduced and the transportation of the mat is facilitated.

A further objective of the present invention is to provide a structure of floor mat of automobile cargo bed, which comprises a mat body showing the property of cushioning so that the mat, when laid on the floor of the cargo bed, provides the effects of shock absorption and sound isolation.

To achieve the above objectives, the present invention provides a structure of floor mat of automobile cargo bed, which is integrally formed and is made of a thermoplastic rubber material. The mat body has an outer contour that is selectively made to match contour of a selected truck cargo bed. The mat body forms a corrugated structure mating raised ribs formed on the floor of the cargo bed so as to allow the mat body to be laid flat on the cargo bed floor and providing complete protection of the cargo bed floor. The mat body has a bottom forming a plurality of triangular prism like grooves. When the mat body is wound up to collapse, the grooves form folding lines that provide an effect of positioning so as to make winding up the mat body easy and providing a reduced collapsed size of the mat, thereby facilitating stowage and transportation of the mat.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 5 is a schematic view illustrating an application of the floor mat of automobile cargo bed according to the present invention.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-3 and 5, the present invention provides a structure of floor mat of automobile cargo bed, which generally comprises a mat body 10 that is integrally formed as a unitary member made of thermoplastic rubbers.

The mat body 10 has an outer contour that is selected to match a contour and size of an interior floor of a cargo bed 20 of a desired model and brand of truck. The instant embodiment is applicable to a truck model that has a cargo bed of which a floor forms a plurality of raised ribs, and accordingly, the mat body 10 has a surface forming raised portions 11 corresponding to the raised ribs of the truck bed floor and the bottom of the mat body is recessed at portions corresponding to the raised portions 11 to form recessed troughs 12 (see FIG.

Figure 1:
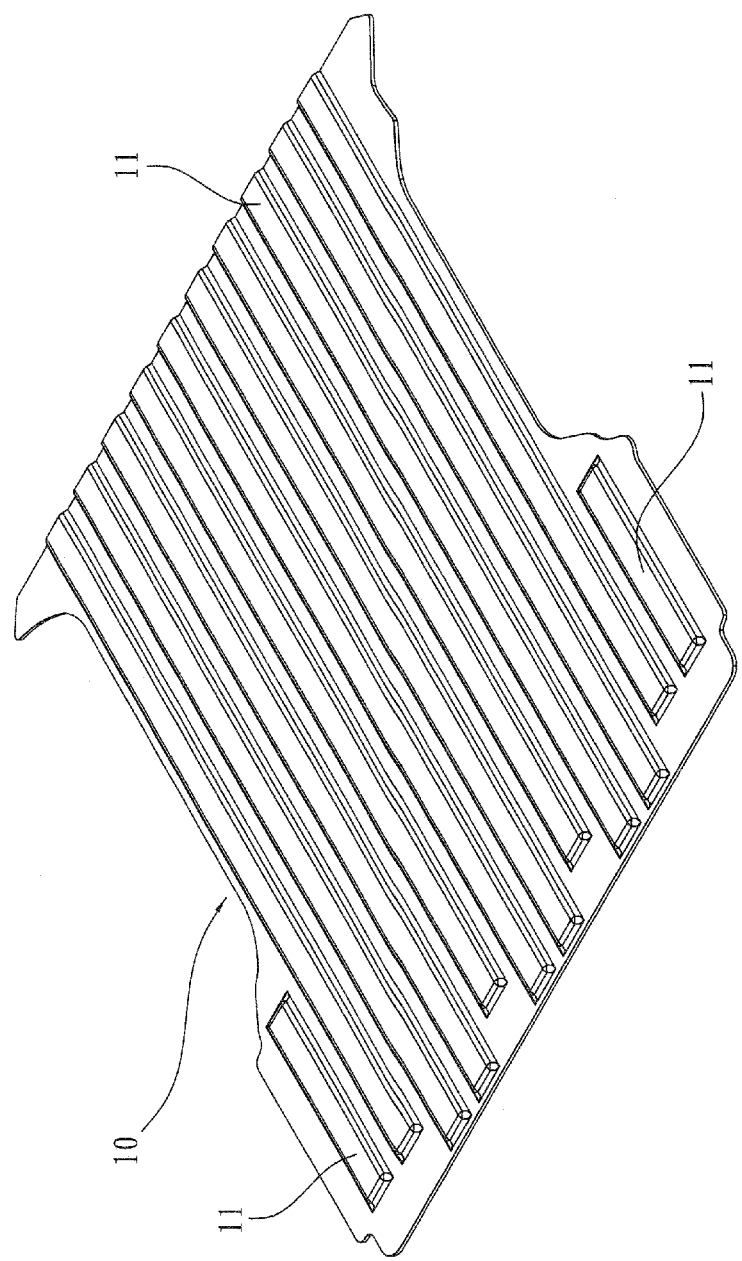
FIG. 1 is a top-side perspective view of a floor mat of automobile cargo bed according to the present invention.
Figure 2:
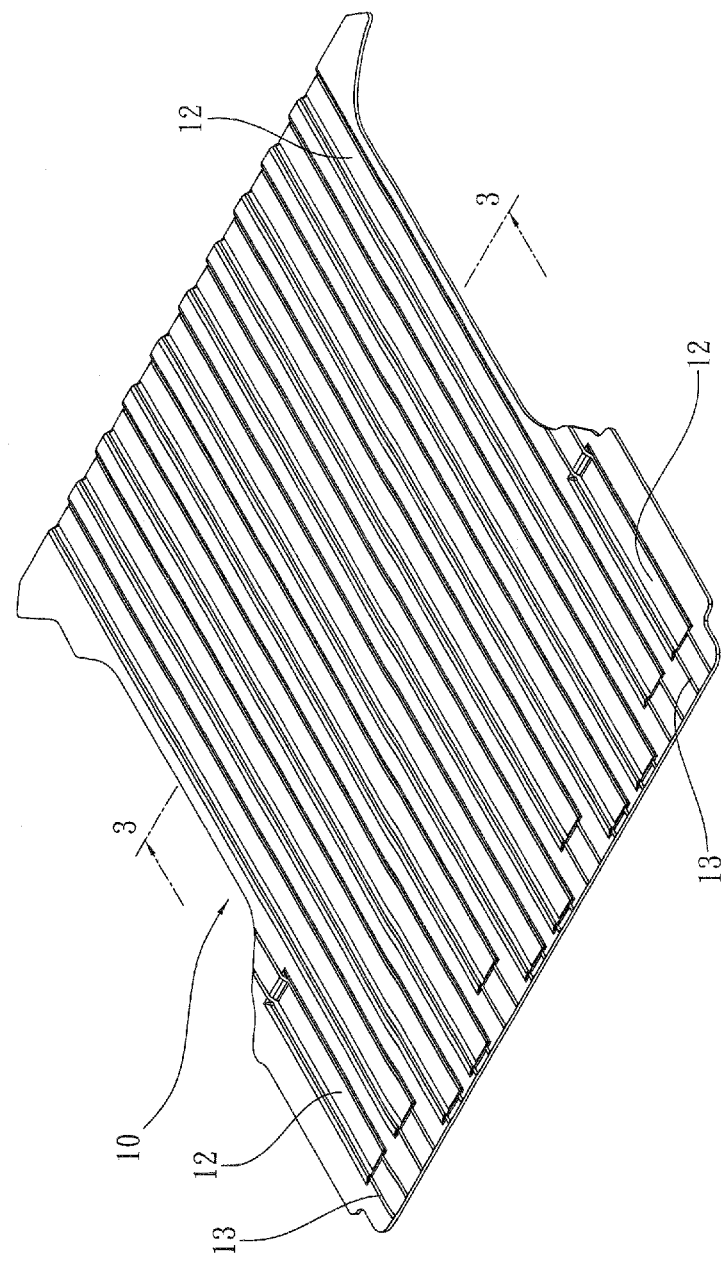
FIG. 2 is a bottom-side perspective view of the floor mat of automobile cargo bed according to the present invention.
Figure 3A:
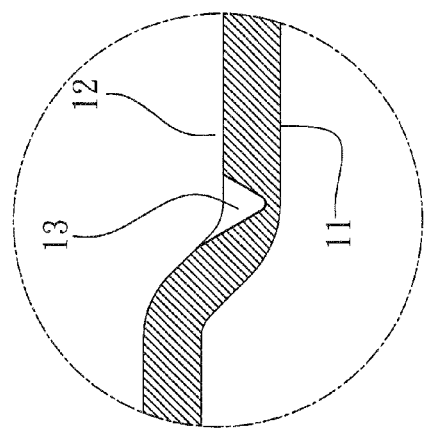
FIG. 3a is an enlarged view of a circled portion of FIG. 3.
Figure 3:
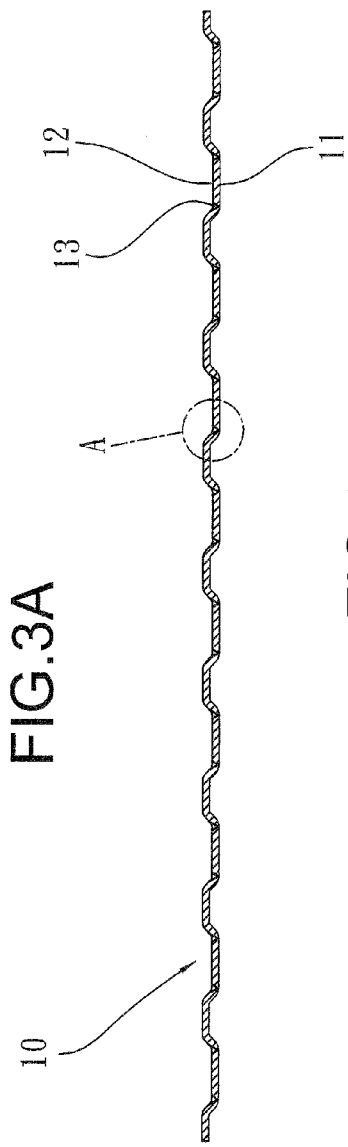
FIG. 3 is a cross-sectional view of the floor mat of automobile cargo bed according to the present invention.

2) for receiving the raised ribs of the truck bed floor, whereby the mat body 10 can be laid flat on the floor of the cargo bed 20 (see FIG. 5). The bottom of the mat body 10 forms a triangular prism like groove 13 (see FIG. 3a) along each side of each recessed trough 12. This provides the novel design of floor mat structure of automobile cargo bed according to the present invention. Preferably, the groove 13 shows an included angle of 60 degrees and thus having a geometric shape of regular triangle, to provide improved convenience for easy collapse and a reduced size of the collapsed mat.

Figure 4:
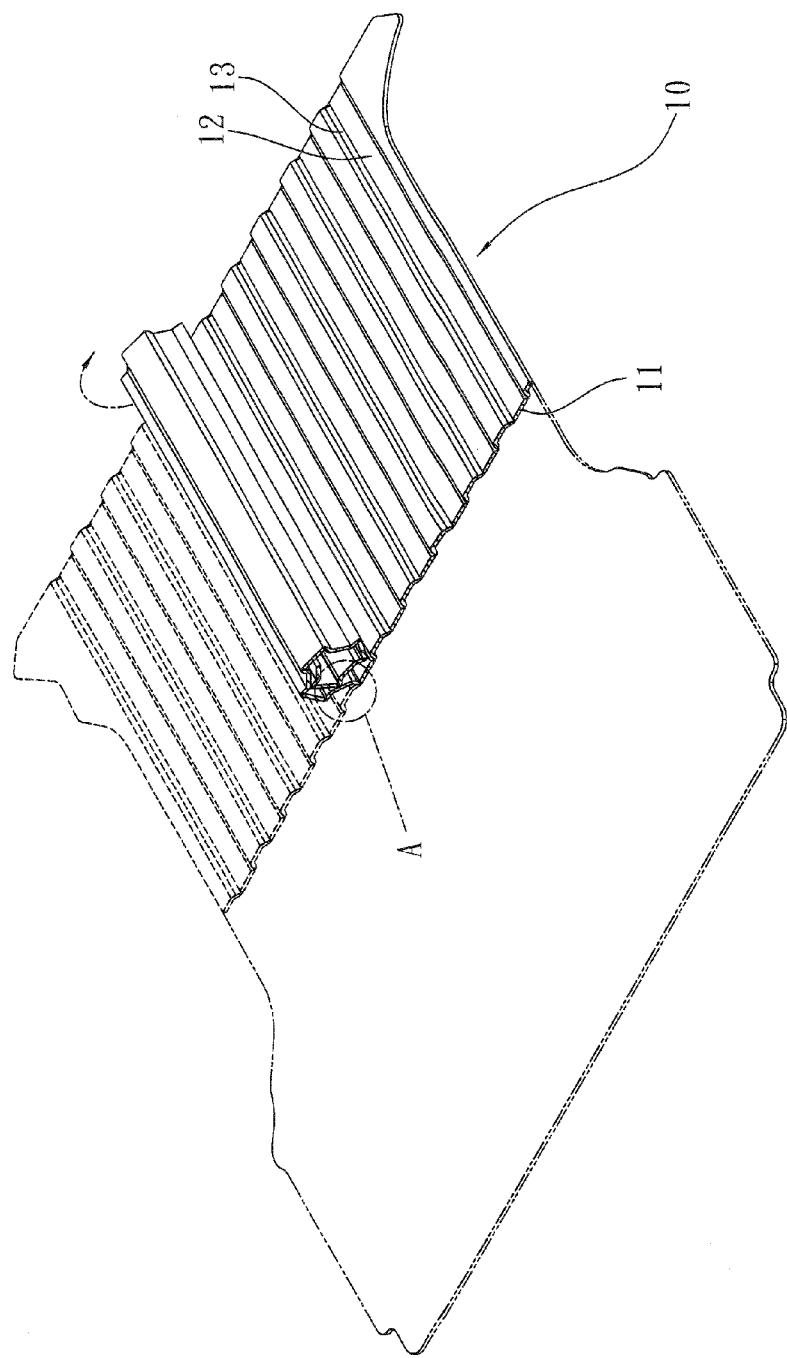
FIG. 4 is a schematic view illustrating winding up the floor mat of automobile cargo bed according to the present invention.
Figure 4A:
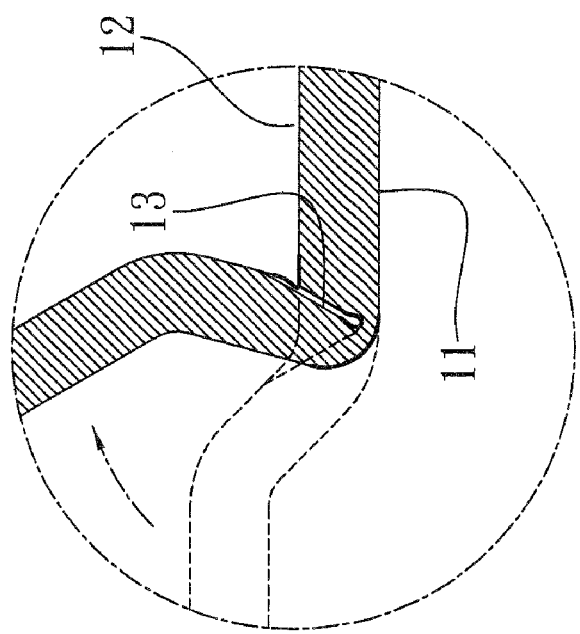
FIG. 4a is an enlarged view of a circled portion of FIG. 4.

Referring to FIGS. 4 and 5, when the mat body 10 is put into use, the properties of flexibility, softness, and cushioning of the thermoplastic material that makes the mat allow the mat body 10 to be firmly attached to the floor of the cargo bed 20 in order to realize protection of the floor of the cargo bed 20 from being damaged and scratched and also offers the functions of skidding resistance, noise resistance, and cushioning. To collapse and stow the mat body 10, a use may rely on the triangular prism like grooves 13 formed in the bottom of the mat body 10 to wind up the mat in a given direction to collapse the mat. In winding up the mat, the grooves 13 form folding lines that make folding traces on the bottom of the mat reduced and improve positioning engagement between surfaces defining a folding line (see FIG. 4a). This makes the winding up easy and efficient and undesired expansion caused by the stiffness of the material of the mat can be eliminated, thereby ensuring a minimized collapsed mat size.

In summary, the present invention provides a structure of floor mat of truck cargo bed that is easy to collapse and has a reduced collapsed size to facilitate stowage and shipping of the mat.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of floor mat of cargo bed, which comprises a mat body that is integrally formed and is made of a thermoplastic rubber material, the mat body having an outer contour that is selectively made to match contour of a selected truck cargo bed; characterized in that:
   the mat body has a surface forming raised portions and a bottom having portions corresponding to the raised portions and recessed to form recessed troughs for receiving therein raised ribs formed on a floor of the truck cargo bed, the mat body forming an approximately triangular prism-shaped groove along each of opposite sides of each of the recessed troughs, whereby the grooves form folding lines that makes winding up the mat body easy and providing a reduced wound-up size of the mat.

2. The structure of floor mat of cargo bed according to claim 1, wherein each of the grooves of the mat body forms an approximately regular triangle and has an interior angle of 60 degrees.

* * * * *